US008687557B2

(12) United States Patent
Perkuhn et al.

(10) Patent No.: US 8,687,557 B2
(45) Date of Patent: Apr. 1, 2014

(54) MANAGING USER REGISTRATIONS OF ROAMING IMS USERS

(75) Inventors: Heiko Perkuhn, Aachen (DE); Marc Vorwerk, Aachen (DE); Rene Rembarz, Aachen (DE); Rosa Maria Martinez Perallon, Aachen (DE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 83 days.

(21) Appl. No.: 13/321,102

(22) PCT Filed: May 19, 2009

(86) PCT No.: PCT/EP2009/003583
§ 371 (c)(1),
(2), (4) Date: Feb. 10, 2012

(87) PCT Pub. No.: WO2010/133238
PCT Pub. Date: Nov. 25, 2010

(65) Prior Publication Data
US 2012/0134323 A1   May 31, 2012

(51) Int. Cl.
*H04W 4/00* (2009.01)
*G06F 15/173* (2006.01)

(52) U.S. Cl.
USPC ............................ 370/328; 455/433; 709/223

(58) Field of Classification Search
None
See application file for complete search history.

(56) References Cited

U.S. PATENT DOCUMENTS

| | | | |
|---|---|---|---|
| 6,826,167 B2 | 11/2004 | Osafune et al. | |
| 7,277,702 B2 * | 10/2007 | Ropolyi et al. | 455/433 |
| 8,457,631 B2 * | 6/2013 | Choksi et al. | 455/435.1 |
| 2002/0072367 A1 | 6/2002 | Osafune et al. | |
| 2006/0252424 A1 | 11/2006 | Ohno et al. | |
| 2007/0207818 A1 | 9/2007 | Rosenberg et al. | |
| 2008/0004006 A1 * | 1/2008 | Datta et al. | 455/432.1 |
| 2008/0039081 A1 * | 2/2008 | Ma et al. | 455/433 |
| 2008/0064398 A1 * | 3/2008 | Zhu | 455/435.1 |
| 2008/0176589 A1 | 7/2008 | Bantukul | |

(Continued)

FOREIGN PATENT DOCUMENTS

| | | |
|---|---|---|
| WO | 0070798 A1 | 11/2000 |
| WO | 02102107 A1 | 12/2002 |
| WO | 2009/042670 A1 | 4/2009 |

OTHER PUBLICATIONS

Garcia, M. "Private Session Initiation Protocol Extension for Visited Network Identifier." IETF Network Working Group, Internet Draft, <draft-garcia-sip-visited-network-id-01.txt>, May 2002.

(Continued)

*Primary Examiner* — Clemence Han
(74) *Attorney, Agent, or Firm* — Coats & Bennett, P.L.L.C.

(57) ABSTRACT

Techniques for managing a registration of a roaming user terminal (116) in its IMS home network (102) based on a roaming agreement between the visited IMS network (104) and the home IMS network (102) are described. According to one embodiment of the invention, a method for managing user registrations in the first IMS network (102) is provided. The method may be performed in an I-CSCF (106) of the first IMS network and comprises the steps of determining a status change in an automatically established roaming agreement with the second IMS network; and sending, based on the determination result, roaming status update information (204) to an HSS (110) associated with the first IMS network for initiating a registration update of the user.

33 Claims, 10 Drawing Sheets

(56) References Cited

U.S. PATENT DOCUMENTS

| | | | |
|---|---|---|---|
| 2008/0194255 A1* | 8/2008 | Walker et al. | 455/433 |
| 2009/0093249 A1* | 4/2009 | Zhu et al. | 455/433 |
| 2009/0172138 A1 | 7/2009 | Wang et al. | |
| 2009/0264096 A1 | 10/2009 | Cai et al. | |
| 2010/0085937 A1* | 4/2010 | Pressley et al. | 370/331 |

OTHER PUBLICATIONS

Zte, "Proposal on VPLMN Advertisement and Selection Procedure", 3GPP TSG-SA2 Meeting #35, Oct. 27-31, 2003, Bangkok, Thailand.

Ericsson et al., Clarification of HSS Role in SIP Registration procedure, 3GPP TSG SA2 #14, Sep. 4-8, 2000, Bristol.

3rd Generation Partnership Project, "Technical Specification Group Services and System Aspects; IP Multimedia Subsystem (IMS); Stage 2", Mar. 2009, p. 64, 3GPP TS 23.228 V8.8.0 (Release 8).

3rd Generation Partnership Project, "Technical Specification Group Services and System Aspects; Network composition feasibility study", Jun. 2007, p. 20, 3GPP TR 22.980 V8.1.0 (Release 8).

Ericsson, "Network initiated de-registration procedure", 3GPP TSG SA2, Oct. 9-12, 2000, Sofia-Antipolis.

Roach, A., "Session Initiation Protocol (SIP)—Specific Event Notificaiton", Network Working Group Request for Comments: 3265, Jan. 6, 2002, pp. 1-36, Category: Standards Track, The Internet Society.

* cited by examiner

| Information element name | Mapping to Diameter AVP | Cat. | Description |
|---|---|---|---|
| Visited Network Identifier | Visited Network-Identifier | M | Identifier that allows the home network to identify the visited network |
| Roaming Agreement data | Roaming Agreement Data | M | Data with the acquired agreement after negotiation |
| Roaming-State | Roaming-State | M | New status of the Roaming |

Fig. 7a

| Information element name | Mapping to Diameter AVP | Cat. | Description |
|---|---|---|---|
| Result | Result-Code / Experimental Result | M | Result of the operation. Result-Code AVP shall be used for errors defined in the Diameter Base Protocol |

MANAGING USER REGISTRATIONS OF ROAMING IMS USERS

TECHNICAL FIELD

The invention relates to techniques for managing user registrations in IP Multimedia Subsystem (IMS) networks. More specifically, the invention relates to techniques for managing a registration of a roaming user terminal in its IMS home network based on a roaming agreement between the visited IMS network and the home IMS network.

BACKGROUND

The IP multimedia subsystem (IMS) is a specific domain in mobile communication networks such as in General Packet Radio Service (GPRS) and Universal Mobile Telecommunication Systems (UMTS) networks. IMS enables the centralized provision of multimedia and other services to users. IMS-based services may be used essentially independently of a particular access technique; for example, while normally the access will be based on a packet-based transport mechanism, a user may also access the IMS via a CS (Circuit Switched) domain of, e.g., a GSM network. Independent of the specific access chosen, a user has to register in IMS in order for a provision of IMS services. Registration and service provisioning to a specific user is controlled by a Serving Call State Control Function (S-CSCF) of the IMS.

Roaming scenarios as known for the provisioning of speech services, for example, are also relevant for the provisioning of IMS services. A user may attempt to register in its home IMS network via the IMS domain of a visited network. In this case, the user terminal sends its registration request to a Proxy CSCF (P-CSCF) of the visited network, which forwards the registration request to the user's home network. For this purpose, at least one Interrogating CSCF (I-CSCF) has to be available at the home IMS network, to which the P-CSCF sends the registration request. It is then the task of the I-CSCF to identify an appropriate S-CSCF of the home network and send the registration request thereto.

The prerequisite for such an IMS roaming scenario is that a roaming agreement is in place between the home network and the visited network which defines that and how a visiting user can access a desired service in its home network via the visited network. With regard to IMS services, today's roaming agreements often merely comprise a tunneling approach, e.g. because the visiting network does not have an IMS. This means that the visiting user traffic is tunneled from an SGSN (Serving GPRS Support Node) in the visited network to a GGSN (Gateway GPRS Support Node) in the home network. This solution may not assure a desired QoS (Quality of Service) for the user. Consider for example the case that a simple bearer for Best Effort QoS is provided in the visited network. This might not suffice for the service actually requested by the user from the home network, e.g. in case of a high bandwidth and/or low latency multimedia delivery session such as videotelephony.

The number of IMS domains increases and will most probably continue to increase in the future, including IMS networks with local and/or temporary coverage only which are enabled by cost-efficient "IMS in a box" solutions. In order to be able to flexibly provide multimedia services to the users it is a prerequisite that services can be provided with a desired quality to the IMS users and thus corresponding roaming agreements have to be in place. Currently, roaming agreements are normally set up manually. However, it appears unfeasible from a practical (business) perspective to manually manage the required numbers of roaming relationships in the future, not only in view of the generally increasing number of IMS domains, but in particular with regard to IMS domains which are only temporarily existing, for example for the duration of an exhibition, conference, cultural event, etc.

Moreover, it appears desirable to have the possibility to flexibly update an existing roaming agreement, for example in order to be able to flexibly react on short-term traffic peaks or temporary service offerings, which normally will not be achievable by manual administration of roaming agreements.

For these reasons, procedures for automatically establishing (and updating) roaming agreements between IMS networks are required. The 3GPP Technical Specifications TS 24.228 and TS 24.229 define IMS signalling flows, including signalling flows between IMS networks in case of roaming. However, in these specifications it is assumed that a roaming agreement is either in place or not, i.e. the procedures are based on manually established roaming agreements. The 3GPP Technical Report TR 22.971 describes a form of "automatic" roaming based on a central inter-network service point, which is provided to enable the establishment of roaming relations.

In the 3GPP TR 22.980, implementation examples for so-called Network Compositions are described. Such Compositions are based on a concept developed within the "Ambient Networks Project", in which a generic network architecture has been developed, including generalized control functions and standardized reference points between two networks. The concepts include a generic automatic negotiation procedure performed between networks, see for example the Ambient Networks Deliverable D3-G.1 "Design of Composition Framework" of November 2006, available online on http://www.ambient-networks.org/deliverables.html. However, while generic scenarios for automated roaming agreement negotiations are discussed, no practically applicable solutions for roaming agreements between IMS networks are provided.

In fact, in order that automatic establishment procedures for roaming agreements between IMS network become feasible, various problems remain to be solved in detail. Herein, in particular the following problem is considered: In case of manually set up roaming agreements, when a roaming agreement expires or is terminated, this typically happens statically and therefore the agreement can only be cancelled in the same way, i.e. involving manual interaction and demanding a manual deletion of entries in the HSS. There is no mechanism existing which allows to manage user registrations in the home network in relation to the status of an automatically established roaming agreement. In particular, in case of an expiry or termination of automatically established (dynamic) roaming agreements, users in the visiting network need to be deregistered in the HSS of the home network. An automated mechanism is required in this respect, as, in view of the increasing volume of roaming agreements, manual termination and deregistration will not scale.

SUMMARY

There is a demand for a technique for automatically managing user registrations in a first IMS network in case of a status change in an automatically established roaming agreement between the first and a second IMS network.

This demand is satisfied by a method for managing a user registration in a first IP Multimedia Subsystem "IMS" network. The method is performed in an edge proxy of the first IMS network and comprises the steps of determining a status change in an automatically established roaming agreement with a second IMS network; and sending, based on the determination result, roaming status update information to a user database associated with the first IMS network for initiating a registration update of a user affected by the change in the roaming agreement.

The status change may be determined based on the detection of an expiry of a timer indicating a validity period of the automatically established roaming agreement. For example, the timer may have been started automatically at the time of establishment of the roaming agreement.

In one variant, the method may comprise the further step of sending change information indicative of the status change of the roaming agreement to a corresponding edge proxy in the second IMS network. In another variant, the method may comprise the step of receiving change information indicative of a status change of the roaming agreement from an edge proxy of the second IMS network. The step of determining the status change of the roaming agreement is then based on the received change information.

The status change of the roaming agreement may include at least one of an expiry or termination of the roaming agreement and a change of roaming agreement data related to the roaming agreement which have been agreed upon between the first and second IMS networks when automatically establishing the roaming agreement. Thus, the change information may for example indicate an expiry or termination of the roaming agreement.

The above-indicated demand is further satisfied by a further method for managing user registrations in a first IP Multimedia Subsystem "IMS" network. This method is performed in a user database associated with the first IMS network and comprises the steps of registering, based on an automatically established roaming agreement with a second IMS network, a user visiting the second IMS network; receiving roaming status update information indicating a status change in the roaming agreement; identifying, based on the received roaming status update information, the previously registered user; and sending registration update information indicating a registration update of the identified user to a user registrar serving the identified user in the first IMS network.

The status update information may be received from an edge proxy of the first IMS network. The method may further comprise the step of initiating a registration update of the identified user in the user database based on the received roaming status update information.

Some or all of the user profiles managed by the user database may comprise a visited network identifier indicating an IMS network separate from the first IMS network via which the corresponding user has registered. In one realization of the method, the step of identifying the user for registration update is performed based on the visited network identifiers in the user profile. In this case, the step of registering users visiting a separate IMS network may comprise setting the visited network identifier in the corresponding user profiles. In one variant of the method, the roaming status update information may comprise a visited network identifier.

The above-indicated demand is moreover satisfied by a still further method for managing user registrations in a first IP Multimedia Subsystem "IMS" network. This method is performed in a user registrar associated with the first IMS network and comprises the steps of receiving, from a user database associated with the first IMS network, registration update information indicating a registration update of a user visiting a second IMS network and registered in the user database based on an automatically established roaming agreement with the second IMS network; sending, based on the received registration update information, an indication of the registration update to the user visiting the second IMS network; and sending, based on the received registration update information, an indication of the registration update to a Proxy Call State Control Function "P-CSCE" in the second IMS network.

In any of the above outlined methods, the registration update information may indicate a deregistration of the one or more users. Generally, at least one of the roaming status update information and the registration update information may be transported using a Diameter request message.

Further, the abovementioned demand is satisfied by a computer program product, which comprises program code portions for performing the steps of one or more of the methods and method aspects described herein when the computer program product is executed on one or more computing devices, for example an I-CSCF, HSS or S-CSCF. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

The above-indicated demand is satisfied by a node implementing an edge proxy and adapted for managing user registrations in a first IP Multimedia Subsystem "IMS" network. The node comprises a component adapted to determine a status change in an automatically established roaming agreement with a second IMS network; and a component adapted to send roaming status update information to a user database associated with the first IMS network for initiating a registration update of users affected by the change in the roaming agreement.

The node may comprise a component adapted to receive change information indicative of a status change of the roaming agreement from an edge proxy of the second IMS network. In this case, the component adapted to determine the status change of the roaming agreement performs its function based on the received change information.

The above-indicated demand is also satisfied by a node implementing a user database and adapted for managing user registrations in a first IP Multimedia Subsystem "IMS" network. The node comprises a component adapted to register, based on an automatically established roaming agreement with a second IMS network, users visiting the second IMS network; a component adapted to receive roaming status update information indicating a status change in the roaming agreement; a component adapted to identify, based on the received roaming status update information, one or more of the previously registered users; and a component adapted to send registration update information indicating a registration update of the identified one or more users to a user registrar serving the identified one or more users in the first IMS network.

The node may comprise a component adapted to initiate a registration update of the identified users in the user database based on the received roaming status update information.

In case in which user profiles managed by the user database comprise a visited network identifier indicating an IMS network separate from the first IMS network via which the corresponding user has registered, the component adapted to identify one or more users for registration update may perform its function based on the visited network identifiers in the user profiles. In this case the component adapted to register users visiting a separate IMS network may be adapted to set the visited network identifier in the corresponding user profiles during registration.

The above-indicated demand is still further satisfied by a node implementing a user registrar and adapted for managing user registrations in a first IP Multimedia Subsystem "IMS" network. The node comprises a component adapted to receive, from a user database associated with the first IMS network, registration update information indicating a registration update of one or more users visiting a second IMS network and registered in the user database based on an automatically established roaming agreement with the second IMS network; a component adapted to send, based on the received registration update information, an indication of the registration update to the user visiting the second IMS network; and a component adapted to send, based on the received registration update information, an indication of the registration update to a Proxy Call State Control Function "P-CSCE" in the second IMS network.

In some realizations of the above-outlined nodes, the components adapted to send or receive at least one of the roaming status update information and the registration update information may be implemented based on the Diameter protocol.

According to specific variants of the above-described aspects, the edge proxy may be implemented as an Interrogating Call State Control Function "I-CSCF", Interconnect Border Control Function "IBCF", or Session Border Gateway "SBG", the user database may be implemented as a Home Subscriber Server "HSS", and the user registrar may be implemented as a Serving Call State Control Function "S-CSCF".

BRIEF DESCRIPTION OF THE DRAWINGS

In the following, the invention will further be described with reference to exemplary embodiments illustrated in the figures, in which:

FIG. 7a is a table illustrating IEs of an embodiment of a Roaming Update Request message;

FIG. 7b is a table illustrating an IE of an embodiment of a Roaming Update Answer message.

DETAILED DESCRIPTION

In the following description, for purposes of explanation and not limitation, specific details are set forth, such as a specific network structure, signalling protocols, etc., in order to provide a thorough understanding of the current invention. It will be apparent to one skilled in the art that the current invention may be practiced in other embodiments that depart from these specific aspects.

For example, a specific IMS environment will be introduced below for illustrating the invention, wherein the edge proxy functionality is implemented on an Interrogating Call State Control Function "I-CSCF", the user database is implemented on a Home Subscriber Server "HSS", the user registrar is implemented on a Serving Call State Control Function "S-CSCF", and the user proxy is implemented on a Proxy Call State Control Function "P-CSCF". However, it is to be understood that the invention may also be implemented on other functional entities or nodes. With reference to a more general IMS/SIP environment, for example the (SIP) edge proxy functionality may not only be implemented on an I-CSCF, but may additionally or alternatively be implemented on an Interconnect Border Control Function "IBCF", or a Session Border Gateway "SBG". Depending on existing or future SIP implementations, also the roles of the user database, user registrar and/or user proxy may each be implemented on one or more appropriate nodes.

Further, the skilled artisan will appreciate that the current invention may in principle be practiced in other environments that depart from the SIP environment based on the SIP and Diameter protocol used below to illustrate the present invention. In fact, essentially any protocol, including a proprietary protocol, may be used which enables providing the required signalling indications to the participating entities.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

With regard to the drawings it is noted that those entities illustrated in more than one figure are referenced by the same numerals.

Figure 1:
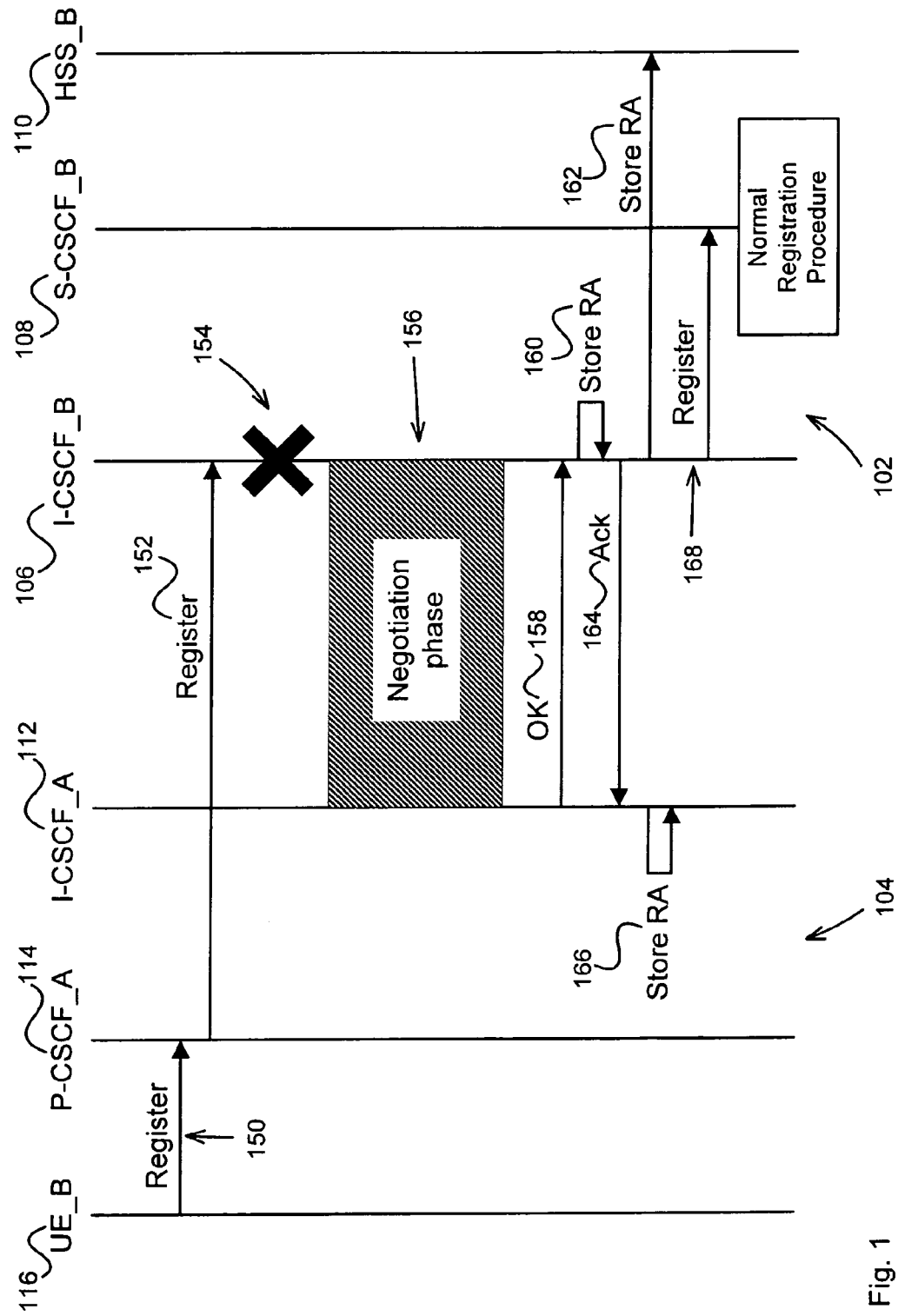
FIG. 1 is a sequence diagram schematically illustrating an automatic establishment of a roaming agreement between two IMS networks.

FIG. 1 illustrates in high-level form an example scenario of how a roaming agreement (RA) may be automatically established between two IMS networks 102 and 104. A User Equipment UE_B 116 is a subscriber of IMS network 102. UE_B 116 is visiting the IMS network 104. With regard to the point of view of UE 116, the network 102 is also referred to as IMS network B, and the network 104 is also referred to as IMS network A. Illustrated in FIG. 1 are the functional entities I-CSSF_B 106, S-CSCF_B 108 and HSS_B 110 of the IMS network B, and I-CSCF_A 112 and P-CSCF_A 114 of IMS network 104 A.

UE_B 116 wants to access IMS services of its home network 102. However, between the IMS networks 102 and 104 no permanent (static) roaming agreement is in place. FIG. 1 illustrates a time point when there is also no automatically established (dynamic) roaming agreement in place, but is automatically established triggered by the registration attempt of UE_B 116. It is assumed that the Diameter and SIP protocol is used for signalling between the components illustrated in FIG. 1.

In step 150, the subscriber UE_B attempts to register to its home network 102 and therefore sends a Register message to the P-CSCF_A 114 of visited network 104. In the embodiment described here it is assumed for brevity that a single border gateway concept is implemented, i.e. the P-CSCF_A 114 will determine always the same I-CSCF, i.e. the I-CSCF 106, to forward the Register message to. In step 152, the P-CSCF_A 114 forwards the register message to the I-CSCF_B 106 of home network 102. The details of the forwarding step 152, such as gathering an IP address of the I-CSCF 106, the existence of a protected channel on network level between the networks 104 and 102 are known to the skilled person and are therefore omitted here.

In step 154, the I-CSCF_B 106 checks whether a roaming agreement exists with network 104 in order to decide whether to forward the Register request to the S-CSCF_B 108. As illustrated by the cross in FIG. 1, it is assumed that the I-CSCF_B 106 determines in step 154 that no roaming agreement is in force yet between networks 102 and 104. Thus, the UE_B 116 is not able to register at its home network 102.

Triggered by the failed registration attempt of UE-B 116, in step 156 the entities 106 and 112 of networks 102 and 104, respectively, negotiate a roaming agreement which is valid for at least the particular subscriber 116. The negotiation in step 156 may consist of an offer/answer procedure which may comprise one or more cycles.

The I-CSCFs 106 and 112 are normally the first point of contact between the IMS networks 102 and 104 and therefore form the negotiating partners in step 156. In other embodiments, the negotiation function or a similar functionality related to an automatic establishment of roaming agreements may additionally or alternatively be located in other nodes of an IMS network. For example, such functionality may be located in an S-CSCF in the home IMS network, which may negotiate a roaming agreement with a P-CSCF in the visited network. In other examples, such functionality may be located in an application server or in a dedicated node. In such embodiments, the I-CSCF may relay the signalling, e.g. the registration request, to the dedicated node. However, when considering for example that the roaming agreement negotiated in step 156 may be provided not only for roaming user 116 but for other users roaming in network 104 as well, using the I-CSCFs of the networks for the automatic roaming agreement establishment process appears advantageous.

When both parties agree on a roaming agreement, in step 158 an OK message is sent and in step 164 an acknowledgement (ACK) message is sent back in order to finalize the negotiation phase 156. While in FIG. 1 it is illustrated that the OK is sent from the visited network to the home network, it is noted that the OK may also be sent from the home network to the visited network and the ACK may be sent from the visited network to the home network.

As indicated by steps 160 and 166, the negotiated roaming agreement is stored in the corresponding I-CSCFs 106 and 112, respectively, and is also stored in the corresponding subscriber databases, wherein only the step 162 of storing the agreement in HSS 110 is illustrated in FIG. 1. In step 168 the procedure for registering user UE_B 116 is performed in the same way as would have been performed when in step 152 a (permanent or dynamic) roaming agreement would have been in force already.

The roaming agreement negotiated in step 156 may cover the user identity of user 116 or of a group of users. The roaming agreement may further indicate the services a roaming user is allowed to access, possibly including predefined QoS characteristics, and technical parameters required for setting up and tearing down sessions between the IMS domains 102 and 104. Such parameters may relate to, e.g., maximum bandwidths, data volumes, etc., and possibly an expiry date of the roaming agreement. Further, while generally a roaming user may request a service from its home network, an automatic negotiation such as that indicated in step 156 can also comprise an agreement that a roaming subscriber may use services of the visited network.

After the roaming agreement of FIG. 1 has been established, it may also be valid for further users attempting to register via visited network 104 in their home network 102 (and for users of network 104 roaming in network 102). In case the roaming agreement cannot be taken as it is for these subsequent users, the roaming agreement may be adapted, i.e. updated, in response to a further registration request. An update procedure of the roaming agreement may include a further negotiation phase similar to that indicated with step 156 in FIG. 1. An update procedure may also be triggered by other events, e.g. at a predetermined point in time, the provision or activation of a new service, etc.

An automatically established (dynamic) roaming agreement may be valid for a limited or unlimited period of time. Even in case no expiry date has been defined for the roaming agreement, there may be events leading to its termination, e.g. when a negotiated maximum amount of data has been transferred or in case the visited IMS is a temporary IMS network which is switched off at a certain point in time.

The following description focuses on the problem of how to identify those users which have been registered based on a particular, automatically established roaming agreement. Such identification is necessary for the purpose of, e.g., de-registering users in case of an expiry or termination of a roaming agreement. It is apparent to the skilled person that a process such as that illustrated in FIG. 2 and described below may also be applied for other purposes requiring an identification of roaming users, for example in case a roaming agreement is to be updated and as a consequence also user registrations in the HSS have to be updated.

Figure 2:
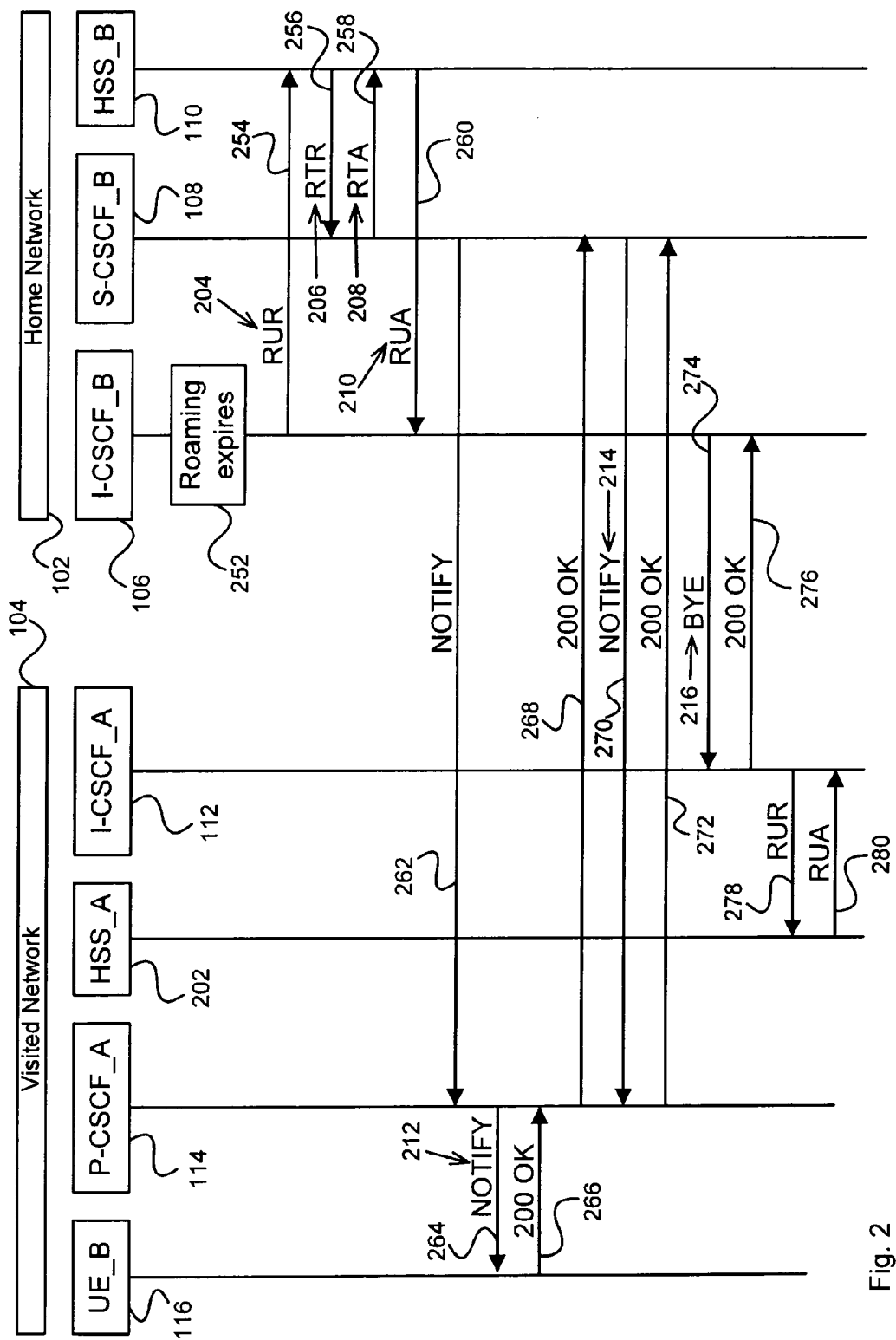
FIG. 2 is a sequence diagram schematically illustrating an embodiment of a de-registration process of a user roaming in a visited IMS network after termination of a roaming agreement.

FIG. 2 illustrates an embodiment of a process for automatically de-registering users in case a roaming agreement expires or is otherwise to be terminated. Typically the process will be applied for automatically established roaming agreements, but in principle it is also applicable for manually established roaming agreements. A deregistration of user terminals is required in case a roaming agreement is to be terminated in order to avoid communication errors which may occur between the roaming user and one or both of the visited and the home network.

Besides the entities already introduced when describing FIG. 1, FIG. 2 shows an HSS 202 of the visited network 104. For the example scenario of FIG. 2 it is assumed that, when the roaming agreement negotiated in FIG. 1 expires, the user UE-B 116 is to be de-registered from the HSS 110 in its home network 102. In step 252, expiry of the automatically established roaming agreement, on the basis of which subscriber UE_B 116 is registered in IMS network 102, is determined in the I-CSCF_B 106. As an example, at the time of establishment of the roaming agreement a timer may have been started indicating the lifetime of the agreement, and the I-CSCF 106 detects expiry of this timer. In step 254, the I-CSCF 106 sends a Roaming Update Request (RUR) message 204 to the HSS 110. The RUR message 204 triggers a change of a state of the roaming agreement to "Terminated", as will be discussed in more detail further below.

On reception of the RUR message 204, the HSS 110 identifies user 116 and possibly further users that have been registered based on the roaming agreement. With regard to user 116, the HSS 110 sends in step 256 a Roaming Termination Request (RTR) message 206 to the S-CSCF 108 serving user 116. The S-CSCF 108 acknowledges reception of the RTR message 206 by sending a Roaming Termination Answer (RTA) message 208 back to the HSS 110 in step 258. In step 260, the HSS 110 responds to the I-CSCF 106 by sending a Roaming Update Answer (RUA) acknowledging the update of the roaming agreement. At that point, the termination of the roaming agreement and the de-registration of the concerned users is finalized from the point of view of the HSS 110. The further de-registration process is controlled by the S-CSCF 108 serving the user 116.

In step 262, the S-CSCF_B 108 sends a Diameter Notify message 212 to the P-CSCF_A 114 in the visited network 104, which acts in step 264 to forward the Notify message 212 to the user UE_B 116. The subscriber 116 acknowledges deregistration by sending, in step 266, a 200 OK message towards the P-CSCF_A 114, which in step 268 forwards the 200 OK message to the S-CSCF_B 108. Further, in step 270, the S-CSCF_B 108 sends a Notify message 214 to the P-CSCF_A 114, which acknowledges reception thereof by sending back a 200 OK message in step 272.

The I-CSCF 106 sends in step 274 a Bye message 216 to the partner I-CSCF_A 112 in visited network 104 in order to alert the partner of the expiration of the roaming agreement. In step 278 the I-CSCF 112 triggers update of the state of the roaming agreement by sending a RUR message to HSS_A 202.

The Bye message 216 has to arrive at the I-CSCF 112 after the UE_B 116 and P_CSCF 114 have received the Notify messages 212 and 214, respectively, and have acknowledged reception thereof. Therefore, a timer mechanisms may be exploited in the I-CSCF 106 in order to delay the Bye message 216 after the reception of the RUA message 210 by an appropriate time span. In other embodiments, the sequence of messages may be altered in comparison to the sequence shown in FIG. 2. For example, the S-CSCF 108 may only send the RTA message 208 back to the HSS 110 after the 200 OK messages acknowledging reception of the Notify messages 212 and 214 have been received. In this case, when the RUA message 210 arrives at the I-CSCF 106, the UE_B 116 and the P-CSCF 114 have already been notified of the de-registration, the I-CSCF can without further delay send the Bye message 216 to the corresponding I-CSCF 112 to eventually end the roaming agreement.

The steps 278 and 280 as well as the operation of the HSS_A 202 triggered by the RUR message received in step 278 may be performed similar to what is discussed with regard to steps 254 and 260 and the related operation of HSS_B 110. The I-CSCF_A 112 may detect expiry or termination of the roaming agreement in a similar way as has been described for the I-CSCF_B 106. In this case, when the Bye message 274 is not received at the I-CSCF_A 112, this node may on its own responsibility send a Bye message to the I-CSCF_B 106 in order to indicate expiry of the roaming agreement. In this way, the steps 252 et seq. may also be triggered by the reception of a Bye message at the I-CSCF_B 106 (not illustrated in FIG. 2).

Figure 3:
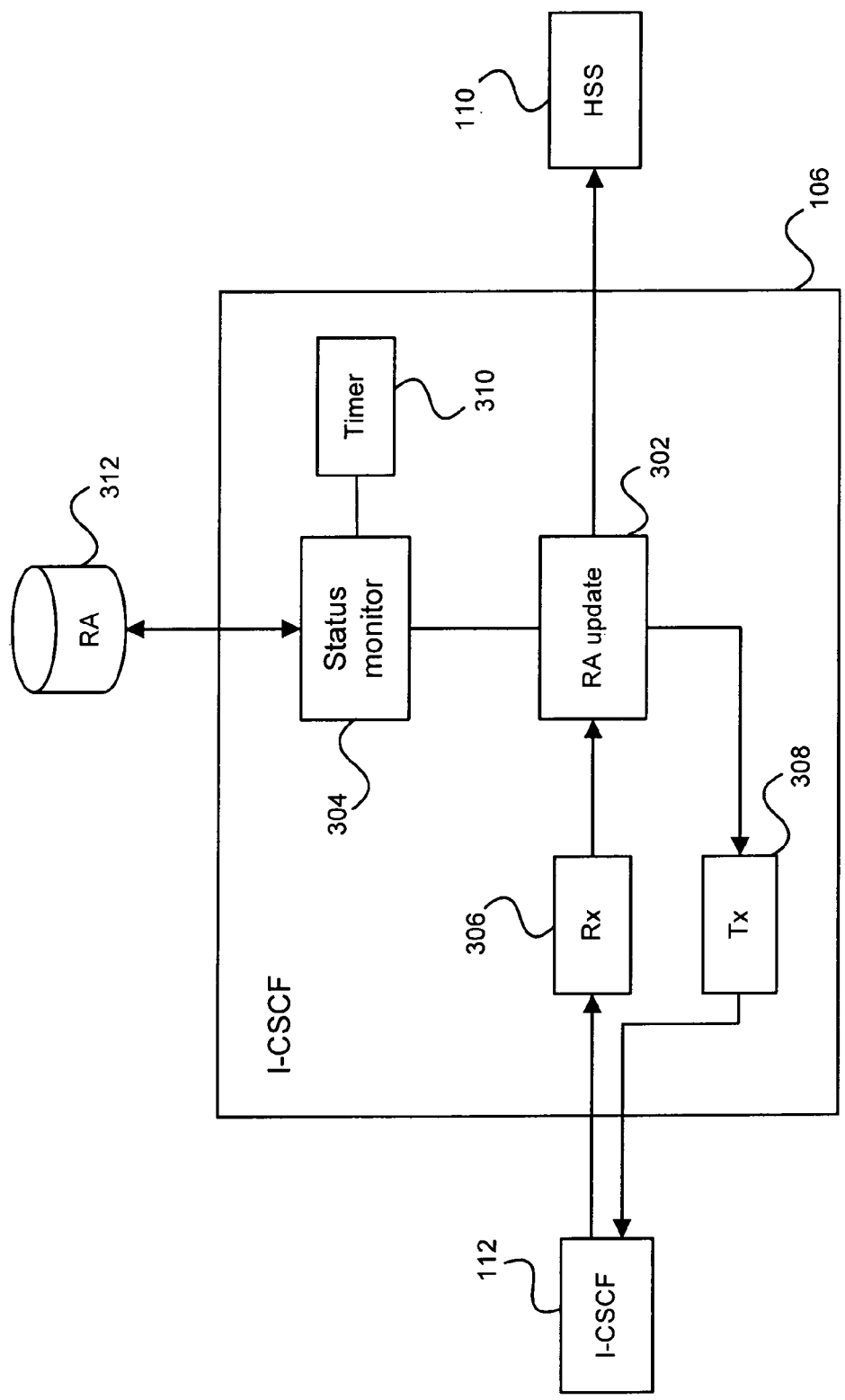
FIG. 3 schematically illustrates functional blocks of an I-CSCF of FIG. 2.
Figure 4A:
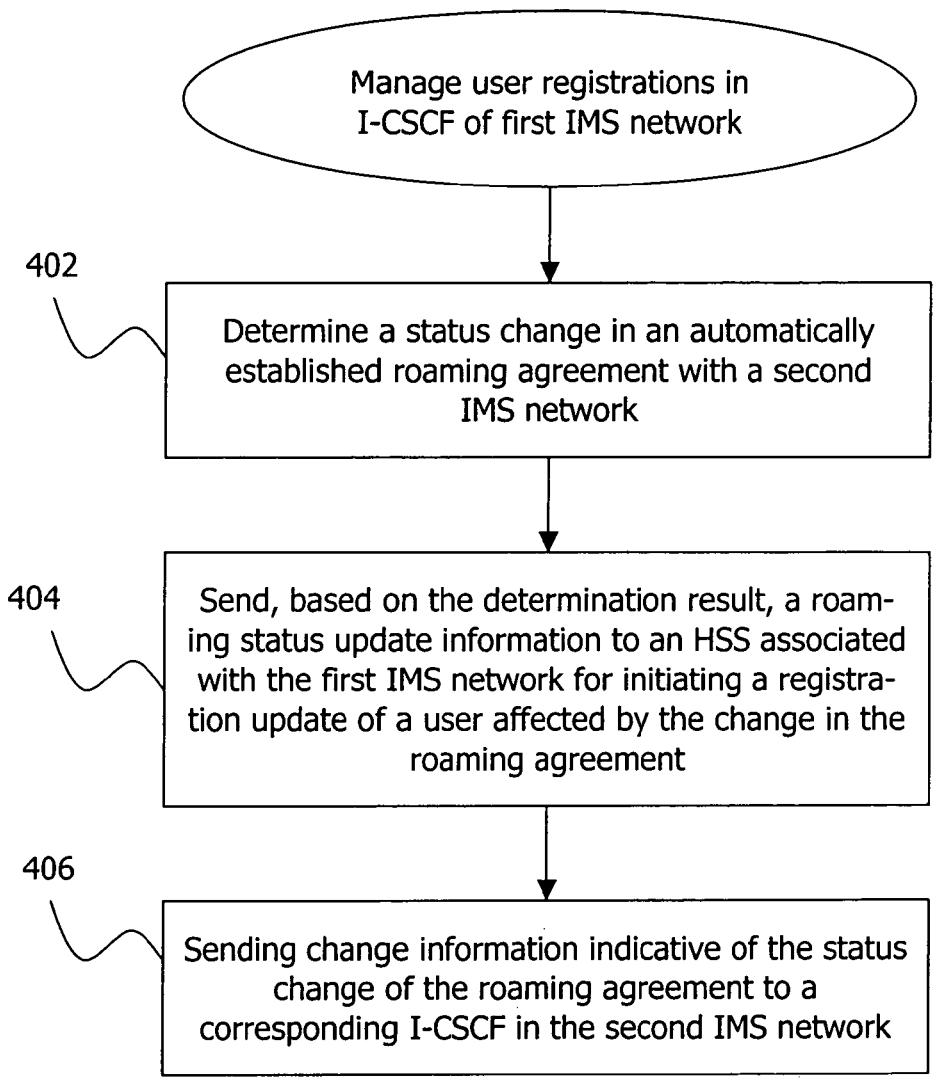
FIG. 4a is a flow diagram illustrating a first operational mode of the I-CSCF of FIG. 3.

FIG. 3 illustrates in more detail functional components of the I-CSCF 106 of FIG. 2. The I-CSCF 106 comprises a roaming agreement (RA) update component 302, a status monitor component 304, a reception component 306 and a transmission component 308. A first operational mode of the I-CSCF 106 is described with reference to FIG. 4a. Basically, the I-CSCF 106 operates to manage user registrations in the IMS network 102.

In step 402, a status change in a roaming agreement with a second IMS network is determined in the status monitor 304. For example, an expiry of a timer 310 may be detected, wherein the timer 310 indicates a duration of the automatically established roaming agreement of FIG. 1. Data related to the roaming agreement may be stored in a storage component 312 associated with the I-CSCF 106 (in one embodiment, the storage component may be the HSS 110). The status monitor 304 provides the determination result to the RA update component 302 which, based on the determination result, sends in step 404 roaming status update information to the HSS 110 in order to initiate a registration update of the one or more users affected by the change in the roaming agreement. With reference to FIG. 2, one implementation of the roaming status update information may be the Roaming Update Request 204 of step 254.

In step 406, change information indicative of the status change of the roaming agreement is sent by the transmission component 308 to a partner I-CSCF in the second IMS network. In the example scenario of FIG. 2, the step 406 is implemented as step 274, according to which the Bye message 216 is sent to the I-CSCF_B 112 of network 104.

Figure 4B:
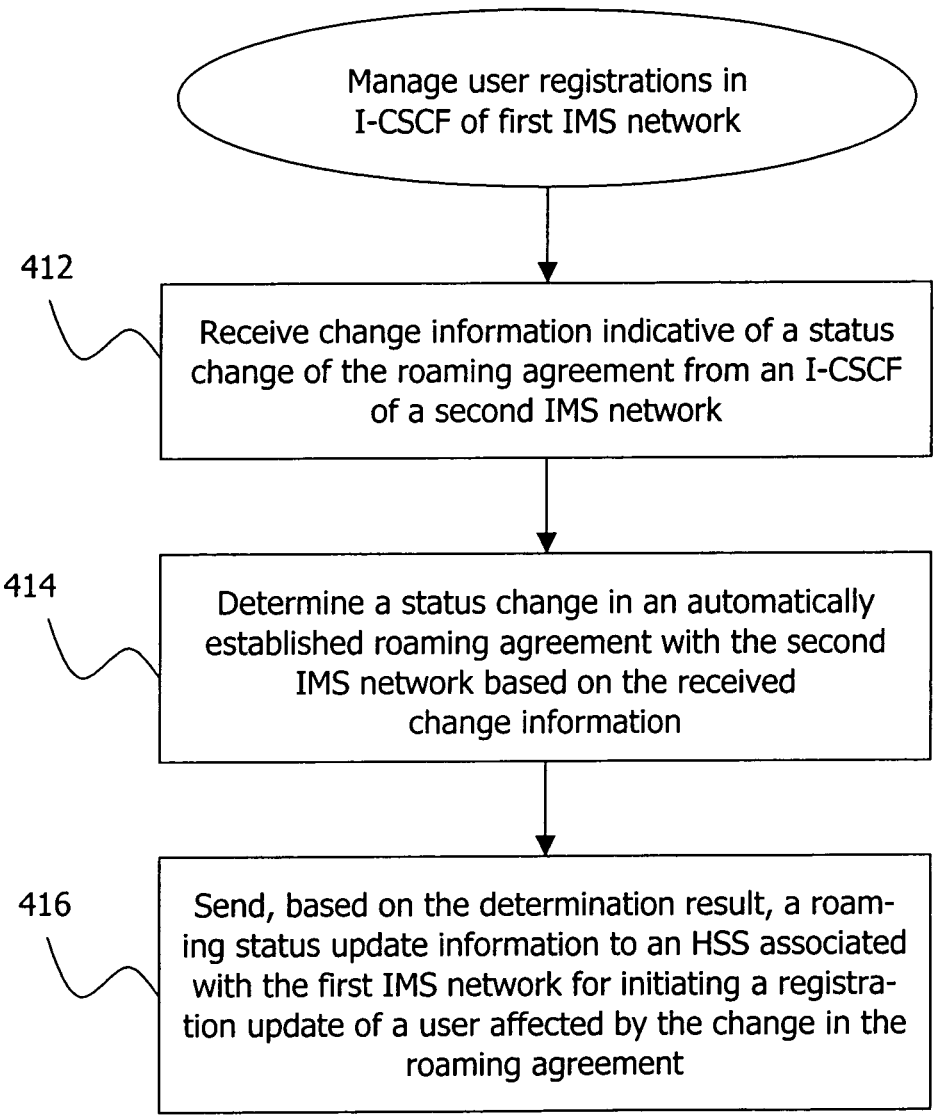
FIG. 4b is a flow diagram illustrating a second operational mode of the I-CSCF of FIG. 3.

The flow diagram of FIG. 4b illustrates another operational mode of the I-CSCF_A 106 of FIG. 3. In step 412, change information indicative of a status change of the roaming agreement is received by reception component 306, for example from the I-CSCF_B 112 of visited network 104. The change information may for example comprise a Bye message (not illustrated in FIG. 2) similar to message 216 in FIG. 2.

In step 414 a determination of a status change is performed based on the detection of expiry of timer 310. The step 416 of sending roaming status update information may be performed similar to what has been described for the step 406 in FIG. 4a.

It is to be noted that besides detection of timer expiry and/or reception of change information also other events may trigger a determination of a status change. For example, the status monitor 304 may monitor that a volume of traffic between the home network and the visited network exceeds a predetermined limit agreed upon in the roaming agreement, such that the roaming agreement has to be terminated temporarily or permanently.

A status change may also be detected in the I-CSCF in the visited network. Consider the situation of the I-CSCF_A 112 in FIG. 2 with regard to the expiry of the roaming agreement: Besides the I-CSCF_B 106, also the I-CSCF_A 112 may have a timer running for indicating the expiry of the roaming agreement. After expiry of the timer, another timer may be started in the I-CSCF_A 112 for a small predetermined additional time period in order to wait for the Bye message 216 to arrive from the I-CSCF_B 106. The additional time period shall be dimensioned in order to allow for the signalling message exchange between the I-CSCF_B and the HSS_B as well as for the notification of the UE_B and the P-CSCF_A as illustrated in FIG. 2. In case no Bye message is received from the partner I-CSCF_B in the home network after the predetermined additional time period, the I-CSCF_A may send itself a Bye message to the home network in order to indicate termination of the roaming agreement. In this way, each of the involved I-CSCFs may initiate the process of terminating a roaming agreement and de-registering the concerned users.

Figure 5:
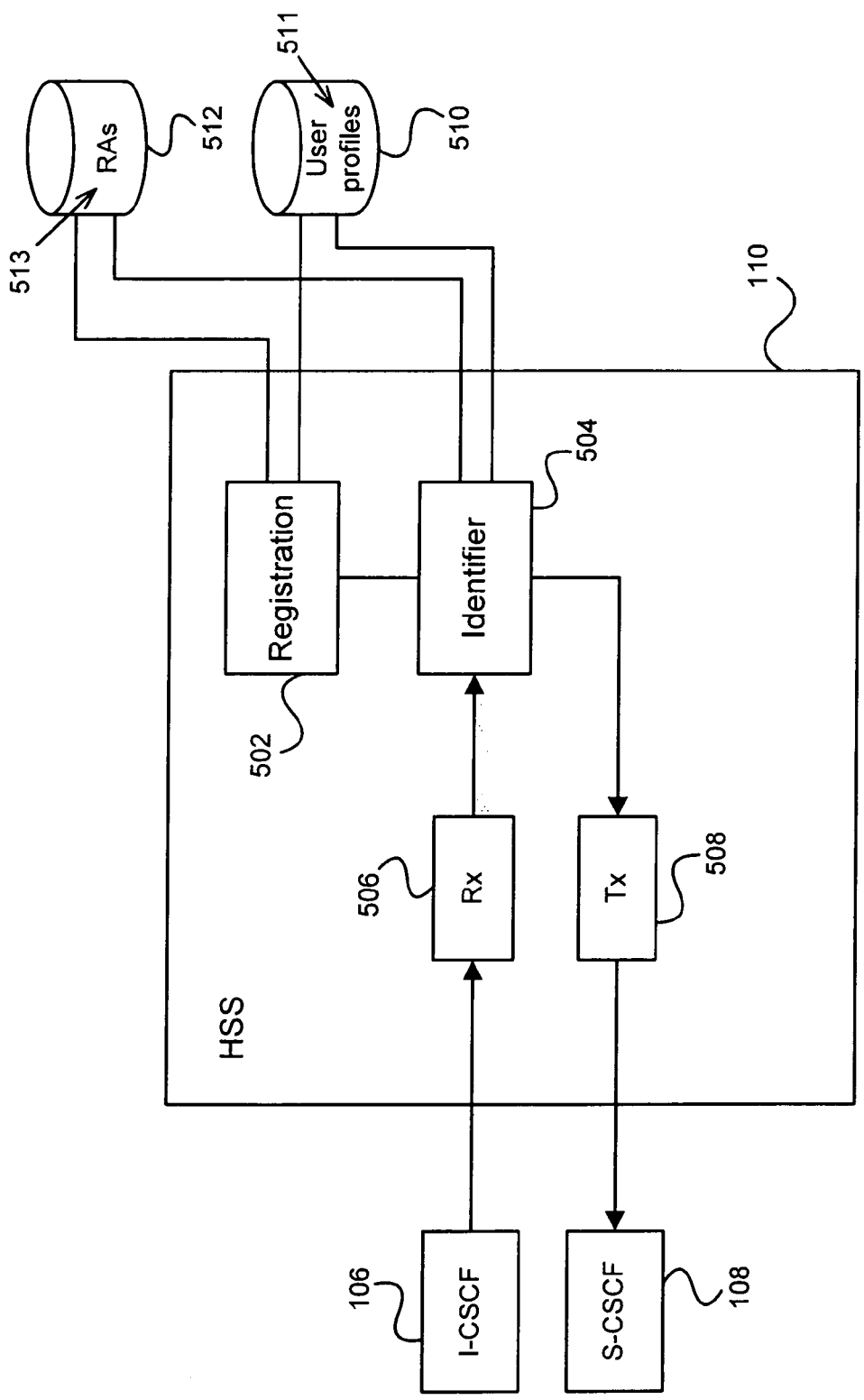
FIG. 5 schematically illustrates functional blocks of an HSS of FIG. 2.
Figure 6:
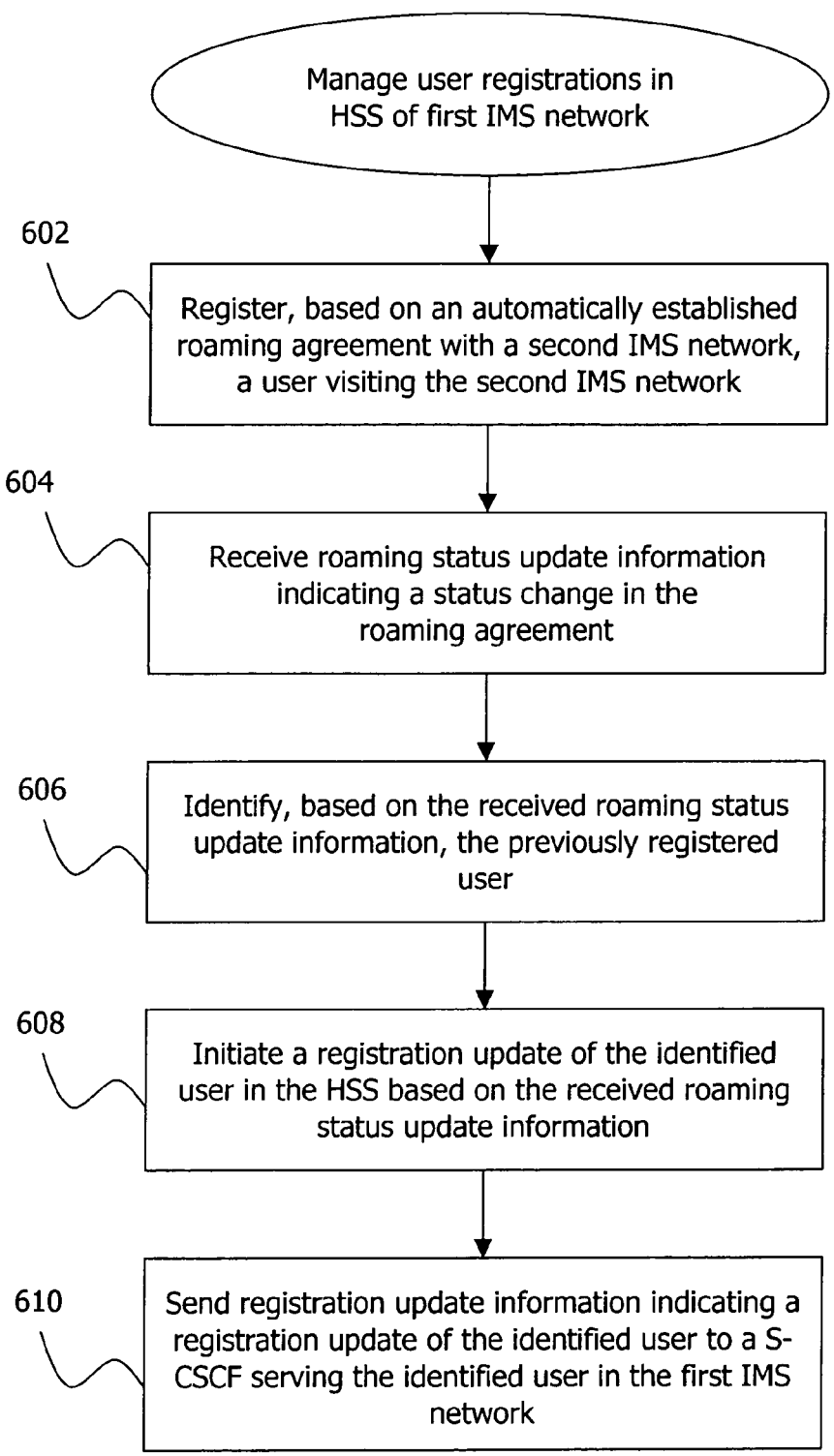
FIG. 6 is a flow diagram illustrating an operation of the HSS of FIG. 5.

FIG. 5 illustrates in more detail functional components of the HSS 110 of FIG. 2. The HSS 110 comprises a registration component 502, an identification component 506, a reception component 506 and a transmission component 508. An operation of the HSS 110 is described with reference to the flow diagram of FIG. 6. Generally, the HSS 110 operates to manage user registrations in the IMS network 102 to which the HSS is associated.

In step 602, (again exemplarily referring to the scenario of FIG. 2) the user terminal UE_B 116 in visiting network 104 is registered in the HSS 110 by the registration component 502 which may, e.g., access a user profile 511 of the user 116 in a storage area 510 associate with the HSS 110. The registration attempt of user 116 schematically illustrated with steps 150, 152 and 164 in FIG. 1 may form the basis for the registration of the user. Data 513 related to the roaming agreement automatically established in the scenario of FIG. 1 may be stored in a further storage area 512 associated with the HSS 110.

In step 604, roaming status update information indicating a status change in the roaming agreement is received by reception component 506. Referring again to the scenario of FIG. 2, the roaming status update information may comprise the Roaming Update Request (RUR) 204, which is sent by the I-CSCF 106 to the HSS 110 and indicates a termination of the automatically established roaming agreement between networks 102 and 104.

In step 606, based on the received roaming status update information, the previously registered user is identified by the identification component 504. Specifically, the user profile 511 of user 116 as managed by the HSS 110 may comprise a visited network identifier indicating as visited IMS network the network 104, i.e. the visited network identifier identifies the IMS network via which the corresponding user has registered. Thus, when receiving a status change information via component 506, the status change information may indicate the visited network identifier and the identification component 504 may identify those user profiles in storage area 510 which currently are marked with the same visited network identifier.

In another embodiment, the roaming agreements stored in storage area 512 as being currently in force may have associated therewith an indication of the users which have been registered based on this particular roaming agreement. Thus, depending on the implementation, the identification component 504 may access storage 510, storage 512, or both in order to identify users concerned with the roaming agreement to be updated as indicated in the roaming status update information, e.g. the RUR 204 of FIG. 2.

In step 608, the identification component 504 additionally operates to initiate the registration update of the identified user(s) in the user profiles 511 based on the received roaming status update information. Regarding the example scenario of FIG. 2, for example the identification component 504 may act to clear the visited network identifier from the user profile of user 116 in order to in this way indicate at the user 116 is de-registered. In other scenarios an update of a registration in a user profile may comprise, for example, to change a service profile, an indication of a particular QoS, etc. that may be provided to the user in response to a change in the roaming agreement between the home network and the visited network.

In step 610, the transmission component 508 sends registration update information indicating the updated registration to the S-CSCF 108 serving the identified user. In the case discussed here, the HSS 110 sends the Roaming Termination Request (RTR) message 206 to the S-CSCF 108 serving identified user 116, wherein the RTR message 206 indicates termination of the registration of the roaming user UE_B 116 in the HSS 110.

The message pair "Roaming Update Request" RUR 204 and "Roaming Update Answer" RUA 210 schematically indicated in FIG. 2. is now described in more detail with reference to FIGS. 7a and 7b, respectively. In order to insert the data required in the HSS for updating registrations of roaming users, the RUR as sent from the I-CSCF has to include particular information elements (IEs). As exemplarily illustrated in FIG. 7a, the RUR 204 comprises a Visited Network Identifier, i.e. an indication which allows the home network 102 to identify the visited network 104. Further, the RUR 204 comprises an IE Roaming State, which indicates a new status of the roaming agreement with the visited network identified by the visited network identifier. For example, the Roaming State may be indicated as "Established" or "Terminated". The latter indication would then force the HSS to de-register the concerned users and to send a corresponding Roaming Termination Request RTE to the corresponding S-CSCFs. The RUR 204 comprises further an IE Roaming Agreement Data with data related to the roaming agreement after its negotiation. Such data may be, for example, a validity period of the roaming agreement, other limitations such as a traffic volume limitation, or other technical details as discussed further above.

Referring to FIG. 7b, the RUA 210 may comprise the IE Result indicating back to the I-CSCF the result of the operation, for example the successful completion of the de-registration operations. The RUR 204 and RUA 206 may for example be implemented as Diameter command code extensions. While the IEs illustrated in the FIGS. 7a and 7b are defined as of Category (Cat.) Mandatory (M), in other embodiments, one or more of the IEs may be optional.

Figure 8:
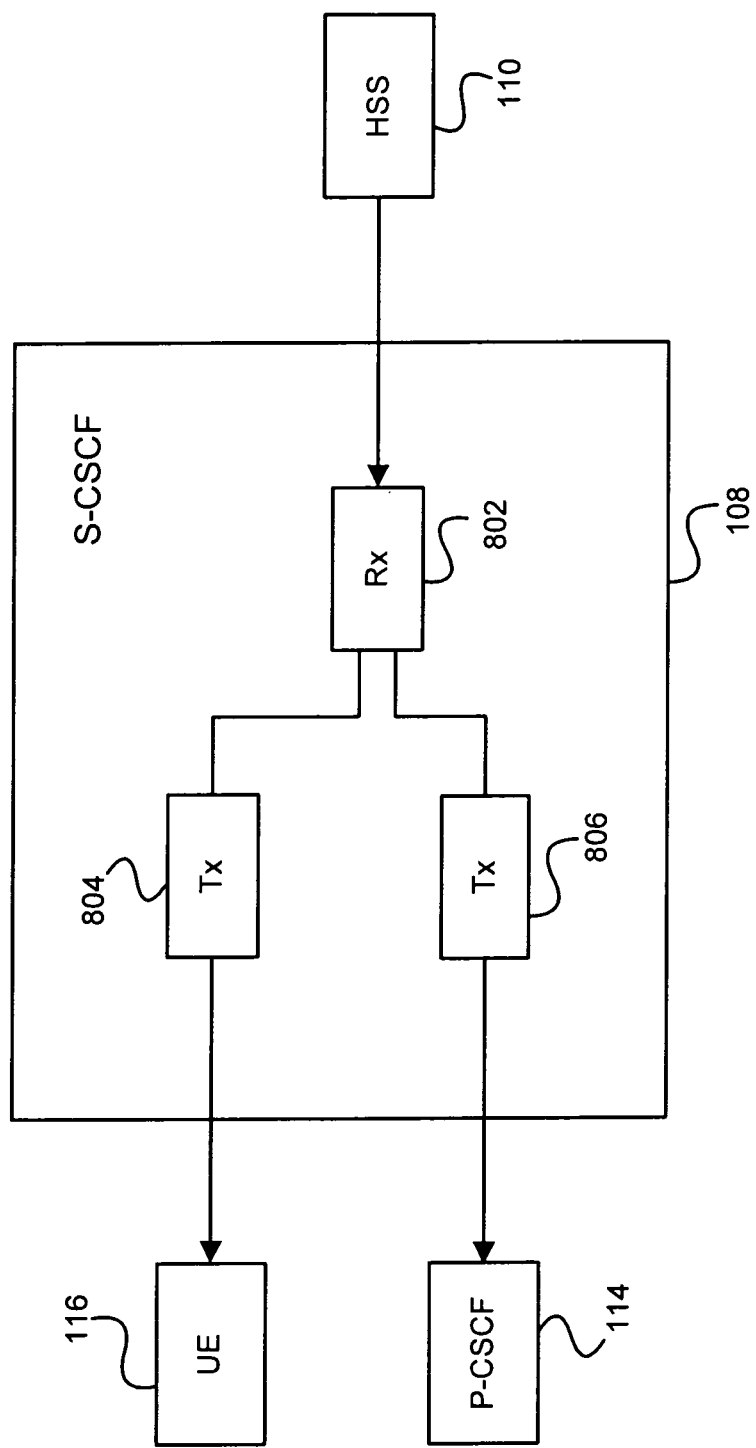
FIG. 8 schematically illustrates functional blocks of an S-CSCF of FIG. 2.

FIG. 8 schematically illustrates functional components of the S-CSCF 108 of FIG. 2. The S-CSCF 108 comprises a reception component 802, a first transmission component 804 and a second transmission component 806. An operation of this embodiment of the S-CSCF 108 is described with reference to the flow diagram of FIG. 9. Generally, the S-CSCF 108 also participates in managing user registrations in the IMS network 102, wherein the user registrations belong to those users specifically served by the S-CSCF 108.

In step 902, the reception component 802 receives from the HSS 110 associated with IMS network 102 registration update information indicating a registration update of a user visiting a second IMS network based on an automatically established roaming agreement with the second IMS network. Again referring to the specific example scenario of FIG. 2, the reception component 802 may receive from the HSS 110 the Roaming Termination Request (RTR) 206 indicating to the S-CSCF 108 that user 116 can no longer roam in visited network 104. In steps 904 and 906, the transmission components 804 and 806, respectively, send an indication of the registration update to the user and the P-CSCF in the visited network. As illustrated in FIG. 2, a Notify message 212 may be sent via the responsible P-CSCF_A 114 of visited network 104 to user UE_B 116. Moreover, the Notify message 214 is sent to the P-CSCF 114 in visited network 114 by transmission component 806.

Figure 9:
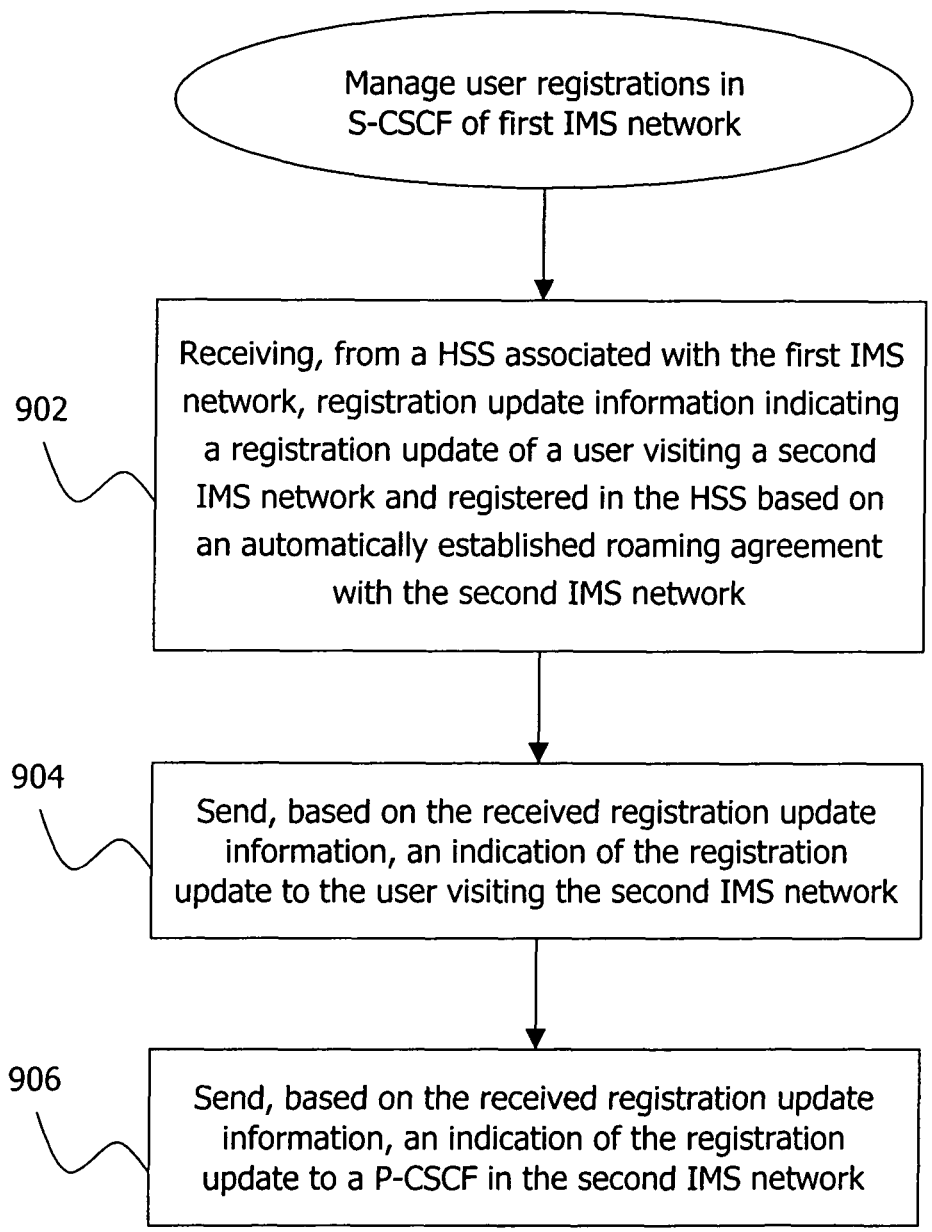
FIG. 9 is a flow diagram illustrating an operation of the S-CSCF of FIG. 8.

The sending of the Roaming Termination Answer 208 back to the HSS_B in FIG. 2 is omitted in FIGS. 8 and 9 for brevity. In other embodiments, the registration update information may indicate a change in the QoS available for the user, for example, which leads to a corresponding change in the services provided by the S-CSCF to the roaming user. In the scenario of FIG. 2, it is to be noted that the UE_B 116 might perform a new registration attempt, in the course of which possibly a new roaming agreement between home network 102 and visited network 104 may enter into force.

The techniques proposed herein contribute to a comprehensive framework for enabling an automated establishment of roaming agreements between IMS networks.

Based on the proposed techniques the time-consuming manual setup of roaming agreements can be minimized. For example, manually established roaming agreements normally do not allow to efficiently change or update even small technical details such as provision of more (peak) resources or different QoS parameters.

An automatic update of roaming agreements can in this respect be very beneficial to the involved network operators but also to the users. For example, the proposed techniques enable to efficiently provide smaller IMS setups with local and/or temporary coverage only, which includes the provision of home network based IMS services to users roaming in these setups. In this way, the benefits of providing such smaller IMS networks increases.

Moreover, the techniques proposed herein have a low impact on existing IMS specifications, as its functionality may be implemented on existing functional entities or nodes and minor modifications are required only; for example, few additional messages only are required which may be implemented, e.g., in the form of some additional Diameter commands. Eventually, dynamic service provisioning of newly introduced services can be simplified.

While the current invention has been described in relation to its preferred embodiments, it is to be understood that this description is for illustrative purposes only. Accordingly, it is intended that the invention be limited only by the scope of the claims appended hereto.

The invention claimed is:

1. A method for managing user registrations in a first Internet Protocol (IP) Multimedia Subsystem (IMS) network, the method being performed in a first edge proxy of the first IMS network and comprising:
   determining a status change in an automatically established roaming agreement with a second IMS network; and
   sending, based on the determination result, roaming status update information to a user database associated with the first IMS network for initiating a registration update of a user affected by the change in the roaming agreement.

2. The method according to claim 1, further comprising sending change information indicative of the status change of the roaming agreement to a corresponding second edge proxy in the second IMS network.

3. The method according to claim 1, wherein said determining the status change comprises determining the status change based on detection of an expiry of a timer indicating a validity period of the automatically established roaming agreement.

4. The method according to claim 1, further comprising receiving change information indicative of the status change of the roaming agreement from a second edge proxy of the second IMS network, wherein said determining the status change comprises determining the status change of the roaming agreement based on the received change information.

5. The method according to claim 1, wherein the status change includes at least one of (a) an expiry or termination of the roaming agreement and (b) a change of roaming agreement data related to the roaming agreement that have been previously agreed upon between the first and second IMS networks when automatically establishing the roaming agreement.

6. The method according to claim 1, wherein said sending the roaming status update information comprises sending the roaming status information using a Diameter command.

7. A method for managing user registrations in a first Internet Protocol (IP) Multimedia Subsystem (IMS) network, the method being performed in a user database associated with the first IMS network and comprising:
   registering, based on an automatically established roaming agreement with a second IMS network, a user visiting the second IMS network;
   receiving roaming status update information indicating a status change in the roaming agreement;
   identifying, based on the received roaming status update information, the registered user; and
   sending registration update information indicating a registration update of the identified user to a user registrar serving the identified user in the first IMS network.

8. The method according to claim 7, wherein said receiving the roaming status update information comprises receiving the roaming status update information from an edge proxy of the first IMS network.

9. The method according to claim 7, further comprising initiating a registration update of the identified user in the user database based on the received roaming status update information.

10. The method according to claim 7, wherein user profiles managed by the user database each comprise a visited network identifier indicating an IMS network separate from the first IMS network via which the corresponding user has registered, and wherein said identifying the registered user comprises identifying the registered user based on the visited network identifiers in the user profiles.

11. The method according to claim 10, wherein registering the user visiting the separate IMS network further comprises setting the visited network identifier in the corresponding user profile.

12. The method according to claim 10, wherein the roaming status update information comprises the visited network identifier for the corresponding user.

13. The method according to claim 7, wherein the registration update information further indicates a deregistration of the user.

14. The method according to claim 7, wherein at least one of the roaming status update information and the registration update information is transported using a Diameter command.

15. A method for managing user registrations in a first Internet Protocol (IP) Multimedia Subsystem (IMS) network, the method being performed in a user registrar associated with the first IMS network and comprising:
   receiving, from a user database associated with the first IMS network, registration update information indicating a registration update of a user visiting a second IMS network and registered in the user database based on an automatically established roaming agreement with the second IMS network;
   sending, based on the received registration update information, an indication of the registration update to the user; and
   sending, based on the received registration update information, an indication of the registration update to a user proxy in the second IMS network.

16. The method according to claim 15, wherein the registration update information further indicates a deregistration of the user.

17. The method according to claim 15, wherein said receiving the registration update information comprises receiving the registration update information using a Diameter command.

18. A computer program product stored on a non-transitory computer readable recording medium and comprising program code portions for managing user registrations in a first Internet Protocol (IP) Multimedia Subsystem (IMS) network, the program code portions being executed on one or more computing devices in a first edge proxy of the first IMS network and comprising program code portions configured to:
- determine a status change in an automatically established roaming agreement with a second IMS network; and
- send, based on the determination result, roaming status update information to a user database associated with the first IMS network for initiating a registration update of a user affected by the change in the roaming agreement.

19. A computer program product stored on a non-transitory computer readable recording medium and comprising program code portions for managing user registrations in a first Internet Protocol (IP) Multimedia Subsystem (IMS) network, the program code portions being executed on one or more computing devices in a user database associated with the first IMS network and comprising program code portions configured to:
- register, based on an automatically established roaming agreement with a second IMS network, a user visiting the second IMS network;
- receive roaming status update information indicating a status change in the roaming agreement;
- identify, based on the received roaming status update information, the registered user; and
- send registration update information indicating a registration update of the identified user to a user registrar serving the identified user in the first IMS network.

20. A computer program product stored on a non-transitory computer readable recording medium and comprising program code portions for managing user registrations in a first Internet Protocol (IP) Multimedia Subsystem (IMS) network, the program code portions being executed on one or more computing devices in a user registrar associated with the first IMS network and comprising program code portions configured to:
- receive, from a user database associated with the first IMS network, registration update information indicating a registration update of a first user visiting a second IMS network and registered in the user database based on an automatically established roaming agreement with the second IMS network;
- send, based on the received registration update information, an indication of the registration update to the first user; and
- send, based on the received registration update information, an indication of the registration update to a user proxy in the second IMS network.

21. A node implementing a first edge proxy and configured to manage user registrations in a first Internet Protocol (IP) Multimedia Subsystem (IMS) network, the node comprising:
- a status monitor component configured to determine a status change in an automatically established roaming agreement with a second IMS network; and
- a transmission component adapted to send, based on the determination result, roaming status update information to a user database associated with the first IMS network for initiating a registration update of a user affected by the change in the roaming agreement.

22. The node according to claim 21, further comprising a reception component configured to receive change information indicative of the status change of the roaming agreement from a second edge proxy of the second IMS network, wherein the status monitor component determines the status change of the roaming agreement based on the received change information.

23. The node according to claim 21, wherein the transmission component is configured to send the roaming status update information based on the Diameter protocol.

24. The node according to claim 21, wherein the edge proxy comprises an Interrogating Call State Control Function (I-CSCF), an Interconnect Border Control Function (IBCF), or a Session Border Gateway (SBG), and the user database comprises a Home Subscriber Server (HSS).

25. A node implementing a user database and configured to manage user registrations in a first Internet Protocol (IP) Multimedia Subsystem (IMS) network, the node comprising:
- a registration component configured to register, based on an automatically established roaming agreement with a second IMS network, a user visiting the second IMS network;
- a reception component configured to receive roaming status update information indicating a status change in the roaming agreement;
- an identification component configured to identify, based on the received roaming status update information, the registered user; and
- a transmission component adapted to send registration update information indicating a registration update of the identified user to a user registrar serving the identified user in the first IMS network.

26. The node according to claim 25, wherein the identification component is further configured to initiate a registration update of the identified user in the user database based on the received roaming status update information.

27. The node according to claim 25, wherein user profiles managed by the user database each comprise a visited network identifier indicating an IMS network separate from the first IMS network via which the corresponding user has registered, and wherein the identification component is configured to identify the user for registration update based on the visited network identifiers in the user profiles.

28. The node according to claim 27, wherein the registration component is further configured to set the visited network identifier in the corresponding user profile during registration.

29. The node according to claim 25, wherein the transmission and reception components are configured to send and receive at least one of the roaming status update information and the registration update information, respectively based on the Diameter protocol.

30. The node according to claim 25, wherein the user database comprises a Home Subscriber Server (HSS), and the user registrar comprises a Serving Call State Control Function (S-CSCF).

31. A node implementing a user registrar and configured to manage user registrations in a first Internet Protocol (IP) Multimedia Subsystem (IMS) network, the node comprising:
- a reception component configured to receive, from a user database associated with the first IMS network, registration update information indicating a registration update of a user visiting a second IMS network and registered in the user database based on an automatically established roaming agreement with the second IMS network;
- a first transmission component configured to send, based on the received registration update information, an indication of the registration update to the user visiting the second IMS network; and
- a second transmission component configured to send, based on the received registration update information, an indication of the registration update to a user proxy in the second IMS network.

32. The node according to claim 31, wherein the reception component is configured to receive the registration update information based on the Diameter protocol.

33. The node according to claim 31, wherein the user database comprises a Home Subscriber Server (HSS), the user registrar comprises a Serving Call State Control Function (S-CSCF), and the user proxy comprises a Proxy Call State Control Function (P-CSCF).

* * * * *

UNITED STATES PATENT AND TRADEMARK OFFICE
CERTIFICATE OF CORRECTION

| | | |
|---|---|---|
| PATENT NO. | : 8,687,557 B2 | Page 1 of 1 |
| APPLICATION NO. | : 13/321102 | |
| DATED | : April 1, 2014 | |
| INVENTOR(S) | : Perkuhn et al. | |

It is certified that error appears in the above-identified patent and that said Letters Patent is hereby corrected as shown below:

On Title Page 2, Item (56), under "OTHER PUBLICATIONS", in Column 2, Line 10, delete "Notificaiton"," and insert -- Notification", --, therefor.

In the Specification

In Column 4, Line 4, delete ""P-CSCE"" and insert -- "P-CSCF" --, therefor.

In Column 5, Line 18, delete ""P-CSCE"" and insert -- "P-CSCF" --, therefor.

In Column 5, Line 58, delete "message; and" and insert -- message; --, therefor.

In Column 6, Line 54, delete "I-CSSF_B" and insert -- I-CSCF_B --, therefor.

In Column 6, Line 56, delete "IMS network 104 A." and insert -- IMS network A. --, therefor.

In Column 11, Line 62, delete "FIG. 2." and insert -- FIG. 2 --, therefor.

Signed and Sealed this
Second Day of September, 2014

Michelle K. Lee
*Deputy Director of the United States Patent and Trademark Office*